United States Patent
Sion et al.

(10) Patent No.: US 6,715,678 B1
(45) Date of Patent: Apr. 6, 2004

(54) PORTABLE READER FOR READING MODULES OF THE MINI-CARD FORMAT CONNECTION TO A PERSONAL COMPUTER

(75) Inventors: Jérôme Sion, Paris (FR); Jean-Claude Perrin, Saint Cloud (FR); Michael A. Montgomery, Cedar Park, TX (US)

(73) Assignee: Schlumberger Systemes, Montrouge (FR)

( * ) Notice: Subject to any disclaimer, the term of this patent is extended or adjusted under 35 U.S.C. 154(b) by 0 days.

(21) Appl. No.: 10/009,706

(22) PCT Filed: May 12, 2000

(86) PCT No.: PCT/FR00/01300

§ 371 (c)(1),
(2), (4) Date: Mar. 28, 2002

(87) PCT Pub. No.: WO00/70533

PCT Pub. Date: Nov. 23, 2000

(30) Foreign Application Priority Data

May 12, 1999 (FR) .............................. 99 06122

(51) Int. Cl.⁷ ................................. G06K 7/06
(52) U.S. Cl. ..................... 235/441; 235/492
(58) Field of Search ................. 235/441, 442

(56) References Cited

U.S. PATENT DOCUMENTS 2,802,188 A    8/1957  Badders
5,276,317 A    1/1994  Ozouf et al.
5,887,145 A  * 3/1999  Harari ................. 235/492

FOREIGN PATENT DOCUMENTS

EP    0 830 000 A2    3/1998
EP    0 883 083 A1   12/1998

OTHER PUBLICATIONS

French Search Report dated Jan. 20, 2000, 1 page.

* cited by examiner

Primary Examiner—Harold I. Pitts
(74) Attorney, Agent, or Firm—Rosenthal & Osha L.L.P.

(57) ABSTRACT

The invention relates to a portable reader (1). The reader is characterized in that it comprises a part (2) for electric connection to the port of a computer, whereby said part (2) exhibits four conduction lines (8, 9, 10, 11) in addition to a part (4) for the insertion of a module (5) which is removable and which can store confidential information, comprising the body (27) of a plastic module which is substantially parallelepipedal and rectangular whereby the dimensions thereof are 25 mm long, 15 mm wide and 0.76 mm thick, further comprising an integrated circuit chip provided with contact pads which are electrically connected to contact pads (28) which are flush with one of the surfaces of said module, whereby the insertion part comprises a connector which has pins which are electrically connected to the electric connection lines of the reader and, when the module (5) is inserted into said reader (1), to the contact pads (28) of said module (5). The invention is specifically designed for readers (1) which are to be connected electrically to a USB port in, a computer.

9 Claims, 3 Drawing Sheets

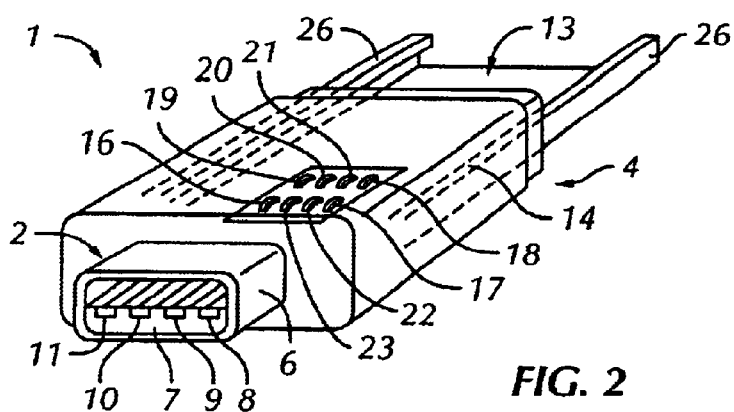
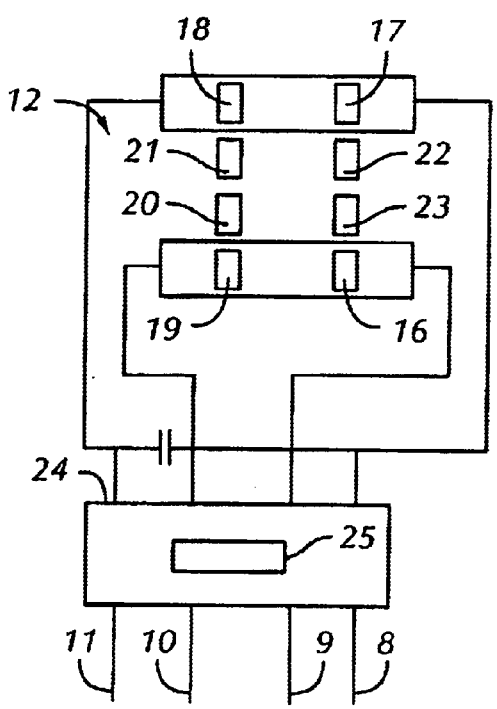
FIG. 2
FIG. 3

PORTABLE READER FOR READING MODULES OF THE MINI-CARD FORMAT CONNECTION TO A PERSONAL COMPUTER

FIELD OF THE INVENTION

The present invention relates to portable readers and, more particularly, to portable readers for reading modules of the mini-card format as defined in appendix A of the ETSI/GSM 11.11 standard in its version 5.3.0 of July 1996.

BACKGROUND OF THE INVENTION

Such modules are essentially used in mobile telephony to identify their holder for a company that manages a telecommunications network of the GSM type (Global System for Mobile Communications). However, these modules are additionally adapted to carry out many other functions. More specifically, in recent developments, these modules include applications programs, in particular written in high level computer languages, which allow them, within the frame of a communication network connection, to ensure electronic transactions, the execution of games, or even the implementation of messaging functions. Of course, due to the small memory capacities and processing speed of such modules, these programs are limited in memory size and execution speed. However, these modules are made secure, portable and at low cost, and therefore are of a great value.

It is known that the security of complex computer systems is not straightforward to implement. When a computer of the personal computer type is connected to a computer network, it is possible for a third party who would have sneaked into this network, to fraudulently access confidential data stored within said computer and, although different solutions have actually been envisioned for protecting such data, none of them is entirely satisfactory.

In addition, it is known that users of computer systems of the above-mentioned kind have an increasing amount of personal confidential information to memorize and manage. For example, it may be passwords identifying them personally. Quite often, these passwords are changed periodically and it becomes difficult for an individual user to keep in a secure place a large amount of personal confidential information.

Finally, it is observed that more and more gateways are installed between the different networks. In particular, such gateways are placed between computer networks within a company and public networks of the internet type, or even between communications networks and such public networks. Thus, it becomes practically possible to access a secondary network from a primary network via such gateways and there is a need for a user of a plurality of networks to be able to use data useful for each of said networks, whatever the chosen entry point.

SUMMARY OF THE INVENTION

Taking into account the above, a problem to be solved by the present invention relates to means for managing data in a practical and entirely secure way, in particular personal data, that are to be used within computer systems.

With respect to the above-described state of the art, a first object of the solution to the technical problem posed is a portable reader that comprises four electrical connection lines for electrical connection to a computer port, and a portion for inserting a module adapted to store confidential information, the module comprising, on the one hand, a plastic module body having a substantially parallelepipedal and rectangular shape with dimensions of the order of 25 mm in length, 15 mm in width and 0.76 mm in thickness and, on the other hand, an integrated circuit chip provided with contact terminals electrically connected to contact pads that are flush with one of the faces of said module, said portion comprising contacts that are electrically connected to the four electrical connection lines of the reader and, when the module is inserted into said reader, to the contact pads of said module.

Thus, the reader, having reduced dimensions, may be connected to an appropriate port of a computer, disconnected therefrom, and carried with its module and the confidential data it contains. The module in itself may be withdrawn from the reader and plugged into another device, for example a mobile phone where the confidential data it carries may be used.

In addition, a second object of the solution proposed by the present invention to solve the above-mentioned technical problem is to provide a method for managing confidential data stored within a secure memory in a module, comprising, on the one hand, a plastic module body of substantially parallelepipedal and rectangular shape, the dimensions of which are about 25 mm in length, 15 mm in width and 0.76 mm in thickness and, on the other hand, an integrated circuit chip provided with contact terminals electrically connected to contact pads that are flush with one of the faces of said module, in which:

the module is inserted into insertion portion a portable reader having four electrical connection lines for electrical connection to a computer port, so that said contact pads of the module are electrically connected to contacts in said insertion portion, the contacts being electrically connected to the four electrical connection lines of the portable reader;

a user connects the reader to a port of a first computer;

data are exchanged between the integrated circuit chip in the module and the first computer;

the user disconnects the reader from the port of the first computer;

the user takes the reader with him/her;

the user connects the reader to a port of a second computer. the first and second computers are one and the same computer. In a second embodiment, the first computer is different from the second computer. On the other hand, advantageously, the data are exchanged via a USB bus system and the user withdraws the module from the reader and inserts it into a mobile phone.

Embodiments of this invention will become more apparent from the following description, which should not be construed in a limiting sense. It is disclosed with reference to the appended drawings, in which:

BRIEF DESCRIPTION OF THE DRAWINGS

FIG. 2 is a perspective view of the removable insertion means of a reader according to the present invention;

FIG. 3 schematically shows different electrical connection lines within a reader according to the present invention;

DETAILED DESCRIPTION

Figure 1:
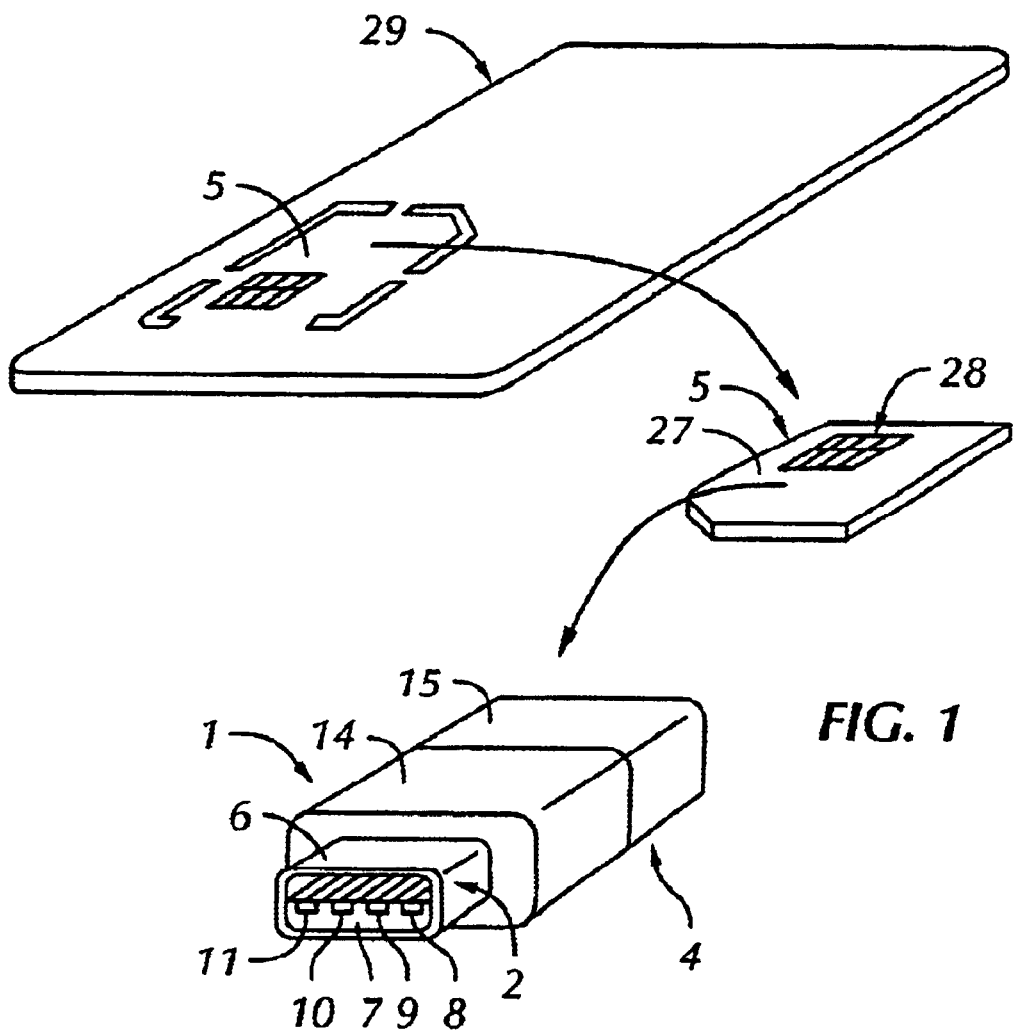
FIG. 1 is a perspective view of the different steps that lead to the use of a reader according to the present invention.

The present invention relates to a portable reader 1.

Such a reader 1 has a weight of the order of a few grams. It is inscribed within a rectangular parallelepiped having length, width and thickness dimensions of the order of 5, 3 and 2 cm, respectively. Thus, a reader 1 according to the present invention may be combined with a key-ring and/or carried within the pocket of its holder.

The reader 1 includes a portion 2 for electrical connection to a port 3 of a personal computer or any other computer hardware for processing data as well as an insertion portion 4 for a removable electronic module 5.

The electrical connection portion 2, as more particularly shown in FIGS. 1, 2, 5A and 5B, has a plastic socket 6 of rectangular cross-section, the open end of which has a support plastic member 7 having 4 parallel metallized lines, and only 4 of them, arranged flush with its surface, and forming a connector for electrically connecting the reader 1 to the port 3. These lines are placed substantially at half the height of the socket 6. A first line 8 is for supplying the reader with a current Vbus, a second and a third lines, 9 and 10, are for digital data communications with said reader 1 and a fourth line 11 is for grounding said reader 1. According to the USB (Universal Serial Bus) standard, version 1.1 of Sep. 23rd 1998, which describes such a connection portion, and the contents of which are integrated within the present disclosure by way of reference, the line 9 is a D− line and the line 10 is a D+ line, D− and D+ designating data signals as defined according to said standard.

The insertion portion 4 is more particularly shown in FIG. 2. It has a connector 12, insertion means 13 for said module 5 as well as a protective shell 14, at its end opposite the connection portion 2, closed by a cap 15.

Connector 12 is composed of a set of at least four bent and aligned pins. In the example disclosed in the present description, the reader 12 has eight metal pins aligned along two four-pin rows. Four among the eight pins are each electrically connected to a connection line. A first pin 17 is connected to a first line 8, a second pin 16 is connected to a second line 9, a third pin 19 is connected to a third line 10 and a fourth pin 16 is connected to a fourth line 11. The lines 8 (GND) and 11 (Vbus) are connected together through a decoupling capacitance of about 100 nF. The other pins, that is the fifth (20), sixth (21), seventh (22), and eighth (23) pins are either connected or not. In the case where they are connected, this may be done to an ISO/USB protocol conversion unit 24 and/or to a clock unit 25, for example, a crystal unit, said units being schematically shown in FIG. 3.

The insertion means 13 are arranged as a set of two opposite foils 26 forming a sliding channel for inserting the module 5 along its edge. These foils 26 direct the module 5 into its position of electrical connection to connector 12.

The protective shell 14 is a plastic shell, for example molded, which covers the connector 12 and the insertion portion 13. The cap 15, which closes the shell 14 is advantageously adapted to block the module 5 in its inserted connection position within the reader 1.

As more particularly shown in FIG. 1, this module 5 is composed of a plastic module body 27 in which is embedded an integrated circuit chip, which is connected, through connection means, to contact pads 28 that are flush with the surface of said module 5.

The module body 5 is arranged as a rectangular parallelepiped with the following approximate dimensions: 25 mm in length, 15 mm in width, and 0.76 mm in thickness. These standardized dimensions are defined, in particular, in Appendix A of the ETSI/GSM 11.11 standard in its version 5.3.0 of July 1996, whose contents are incorporated herein by way of reference.

The integrated circuit chip, which is not shown in the drawings, comprises various operational units among which RAM, ROM and EEPROM memories and a central processing unit CPU which manages, through the data and address bus, data that are generally confidential. Such data may for example be data for identifying the module's holder, public or private encryption keys, coding algorithms, applications programs, or passwords. For example, the chip comprises at least the four following contact pads: Vcc for the chip's power supply voltage, GND for grounding and D+ and D− for transmitting data according to the above-mentioned USB standard. Other contact terminals may be present, for example CLK terminals for clock signal input, I/O terminals for data input and output, according to protocols defined by the ISO7816 and Vpp standards for supplying programming voltages.

The number and position of contact pads 28 of module 5 are standardized according to the above-mentioned ISO7816 standard.

As a consequence, the readers according to the present invention, which are devices conforming to the USB standard, do not include any electronics, except for the units 24 and 25 when they are used. Their manufacturing cost is therefore particularly low.

When a user, who purchased a reader 1 according to the present invention for a small cost, and who has one or several personal computers available which are provided with the adequate ports 3 for connecting said reader 1, desires to use this reader 1, he/she must purchase an electronic module 5. Such a module 5 is generally marketed as a so-called ISO format card, that is, as a card 29 which substantially has a parallelepipedal and rectangular shape with a length of about 85 mm, a width of about 54 mm and a thickness of about 0.76 mm, which has been previously undercut according to the shape of module 5.

The user must then detach the module 5 from its card support and insert it in a removable way from the insertion portion 13 of reader 1. For that purpose, the user withdraws the cap 15 and inserts the module 5 along the foils 26 forming the sliding channel. Once inserted, the contact pins of the reader 1 come into contact with the contact pads 28 of the module, which are respectively associated therewith. The user then closes the cap 15.

Figure 4A:
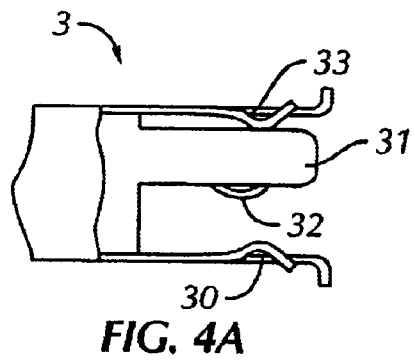
FIGS. 4A and 4B show a lengthwise and front cross-section view of a personal computer USB port, respectively.
Figure 4B:
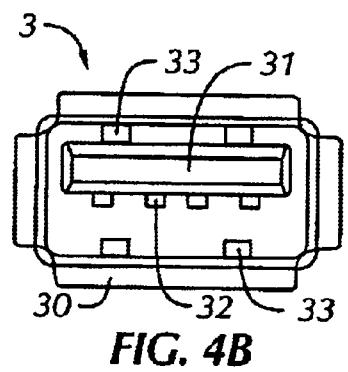
Figure 5A:
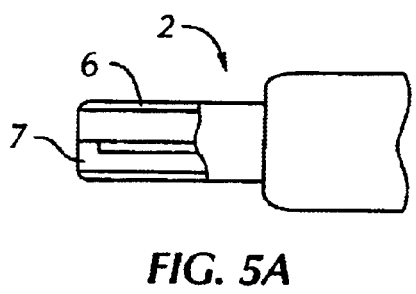
FIGS. 5A and 5B show a lengthwise and front cross-sectional view, respectively, of a portion for connecting a reader according to the present invention to a USB port of the kind shown in FIGS. 4A and 4B.
Figure 5B:
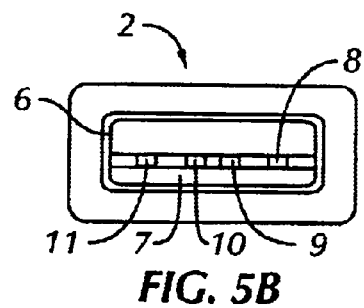
Figure 6:
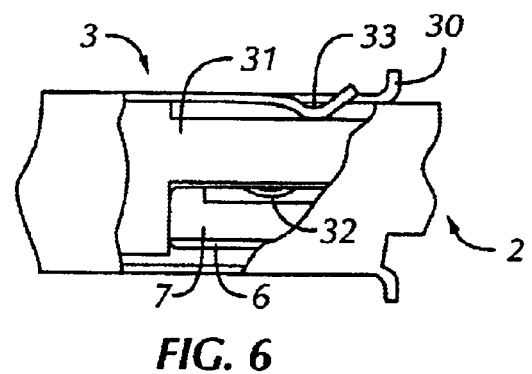
FIG. 6 shows a cross-sectional view of means for connecting a reader according to the present invention to a personal computer port.

Thereafter, the user connects the reader to a computer port 3, that is a port which is integrated to the central processing unit of said computer or which is part of a hub connected, by means of a cable, to said central processing unit. This port is shown in FIGS. 4 and 5. It is a port as described in the above-mentioned USB standard. It has a plastic socket 30 comprising a protruding connection portion 31. Four electrical connection pins 32 are fixed to said portion 31. Four blocking blades 33 are also attached to the socket 30. Their connection is shown in FIG. 6.

When the reader is connected and the computer is powered-on, the computer detects the presence of the reader 1 and data can be exchanged between the chip and the module 5 inserted into the reader 1 and the computer, via the USB bus system. The data exchange protocols are described in the above-mentioned USB standard. The bit-rates of exchanged data are, according to said standard, of 1.5 Mbit/s or 12 MBits/s.

Thus, programs may be executed in a secure way in the chip so as to process data transmitted from the computer. For example, algorithms residing in the module chip memories may be used for on-the-fly coding of data transmitted from the computer and that are due to be transmitted over a network such as the internet. The module may also contain all user passwords or identifier keys and no longer has to fetch them when required, from the module's secured memory.

If the user no longer desires to use the computer, he/she may disconnect the reader and take it with him/her. If the user whishes to use his/her passwords or other confidential information from another computer, it is only necessary to connect the reader according to the present invention to said other computer.

He/she may also withdraw the module from the reader and insert it, for example, in his/her mobile phone, in order to use the data in said module, with said phone.

Thus, in the case when the data from the module's memory are to be used for storing electronic mails, such mails may be obtained by means of either a mobile phone, or a personal computer.

What is claimed is:

1. A portable reader that comprises four electrical connection lines for electrical connection to a computer port, and an insertion portion for inserting a module adapted to store confidential information, the module comprising, on the one hand, a plastic module body having a substantially parallelepipedal and rectangular shape with dimensions of the order of 25 mm in length, 15 mm in width and 0.76 mm in thickness and, on the other hand, an integrated circuit chip provided with contact terminals electrically connected to contact pads that are flush with a face of said module, said insertion portion comprising contacts that are electrically connected to the four electrical connection lines of the reader and, when the module is inserted into said reader, to the contact pads of said module.

2. A reader according to claim 1, wherein the reader is inscribed within a rectangular parallelepiped having length, width and height dimensions, of about 5, 3 and 2 cm, respectively.

3. A reader according to claim 1, wherein the reader constitutes a device according to the USB standard (Universal Serial Bus).

4. A reader according to claim 1, wherein the reader is combined with a key ring.

5. A method for managing confidential data stored within a secure memory in a module, comprising, on the one hand, a plastic module body of substantially parallelepipedal and rectangular shape, the dimensions of which are about 25 mm in length, 15 mm in width and 0.76 mm in thickness and, on the other hand, an integrated circuit chip provided with contact terminals electrically connected to contact pads that are flush with a face of said module, in which:

the module is inserted into an insertion portion of a portable reader having four electrical connection lines for electrical connection to a computer port, so that said contact pads of the module are electrically connected to contacts in said insertion portion, the contacts being electrically connected to the four electrical connection lines of the portable reader;

a user connects the reader to a port of a first computer;

data are exchanged between the integrated circuit chip in the module and the first computer;

the user disconnects the reader from the port of the first computer;

the user takes the reader with him/her; and the user connects the reader to a port of a second computer.

6. A method according to claim 5, characterized in that the first and second computers are the same computer.

7. A method according to claim 5, characterized in that the first computer is different from the second computer.

8. A method according to claim 5, characterized in that the data are exchanged via a USB system.

9. A method according to claim 5, characterized in that the user withdraws the module from the reader and inserts it into a mobile phone.

* * * * *